United States Patent [19]

Harris

[11] Patent Number: 4,902,118
[45] Date of Patent: Feb. 20, 1990

[54] INFANT OBSERVATION MIRROR FOR CAR TRAVEL

[76] Inventor: Sherryll Harris, 1617 Richardson St., Victoria, B.C., Canada, V8S 1R5

[21] Appl. No.: 225,715

[22] Filed: Jul. 29, 1988

Related U.S. Application Data

[63] Continuation-in-part of Ser. No. 69,880, Jul. 6, 1987, abandoned.

[51] Int. Cl.⁴ .............................. G02B 7/18; B60R 1/04
[52] U.S. Cl. .................................. 350/631; 248/475.1; 248/481; 350/618; 350/632
[58] Field of Search ............................ 248/475.1, 481; 350/631, 638, 639, 606, 632, 618, 624

[56] References Cited

U.S. PATENT DOCUMENTS

| | | | |
|---|---|---|---|
| 4,681,366 | 7/1987 | Lobanoff | 248/475.1 |
| 4,702,572 | 10/1987 | Cossey | 248/481 |
| 4,712,892 | 12/1987 | Masucci | 350/631 |
| 4,733,956 | 3/1988 | Erickson | 350/632 |

Primary Examiner—Bruce Y. Arnold
Assistant Examiner—Martin Lerner

[57] ABSTRACT

A mirror assembly for use in observing an infant during travel in a vehicle in which the infant is located in a rear seat and faces toward the back of the vehicle is provided. The assembly includes a plate having a mirrored surface and a plate support having a plate receptacle on one side for holding an image forming surface of the plate in an outwardly exposed position. The plate support also has a tapered cross section in a plane substantially perpendicular to the plate with the width at the top of the support being larger than that at the bottom. Strap means are connected to the support and can be coupled to a rear seat back so as to hold the support in a selected lateral and vertical position on the seat back.

6 Claims, 2 Drawing Sheets

INFANT OBSERVATION MIRROR FOR CAR TRAVEL

The present application is a continuation-in-part of application Ser. No. 069,880, filed in U.S. the U.S. Patent and Trademark office on July 6, 1987, now abandoned.

BACKGROUND

The present invention relates to an infant observation mirror for car travel.

In a typical automobile having front and rear seats, present evidence indicates that the safest location for an infant is in the back seat with the seat oriented such that the infant faces toward the back of the vehicle. In some countries legislation requires infants to be placed in such a position. One of the problems in locating an infant in this position is that the only way that the infant can be observed by a person in the front seat is for that person to bodily turn and lean over the front seat. Clearly, this procedure is not only inconvenient but dangerous should the driver be the one attempting to observe the infant.

U.S. Pat. No. 4,702,572 issued Oct. 27, 1987 to Cossey discloses a system for viewing an infant in the rear seat of a vehicle in which a mirror is attached by means of a mounting bracket to the top of the rear seat back. The Cossey mirror includes a telescopic vertical adjustment, a ball and socket adjustment and a spring-biased mounting bracket. Because of its construction, the Cossey device necessitates the use of rigid material, both to achieve vertical adjustment of the mirror position relative to the seat as well as to allow adjustment of the mirror about a fixed point. Thus, the telescopic mounting tubes, the ball and socket connection and the seat mounting assembly all present the danger of injury to a child or other occupant, either during an accident or upon rapid deceleration of the vehicle. Moreover, the mirror position in the Cossey system presents an obstacle to the vision of the driver through the front rearview mirror out the back windshield of the vehicle. Furthermore, the greater elevation of the mirror makes it more difficult for the infant to look squarely into the mirror, making the mirror less effective as an amusement device for the child.

SUMMARY OF THE INVENTION

According to the invention there is provided a mirror assembly for use in observing an infant during travel in a vehicle in which the infant is located in a rear seat and faces toward the back of the vehicle. The assembly includes a plate having a mirrored surface and a plate support having a plate receptacle on one side for holding an image forming surface of the plate in an outwardly exposed position. The plate support also has a tapered cross section in a plane substantially perpendicular to the plate with the width at the top of the support being larger than that at the bottom. Strap means are connected to the support and can be coupled to a rear seat back so as to hold the support in a selected lateral and vertical position on the seat back. Thus, vertical adjustment can be accomplished by simply moving the support vertically up the surface of the seat back and then tightening the strap means. Proper angular adjustment is provided by a combination of proper lateral positioning and the angle of taper of the support. The absence of any requirement to provide rotation of the mirror about a fixed point means that the mirror can be placed in an enclosure without any solid protruding potentially injurious parts attached as in prior devices.

Preferably the strap means includes a pair of straps affixed to a back of the support, each of sufficient length to pass around the rear seat back so that the ends can be fastened together snugly around the seat back, thus vertical adjustment can simply be accomplished by sliding the straps around the seat back and then tightening them. Similarly, the lateral adjustment can be achieved by simply loosening the straps and moving them along the seat back to one side of the vehicle or the other. The use of straps rather than brackets to provide vertical adjustment again involves no complex solid mechanism as in prior devices in order to achieve this adjustment.

Preferably the cross section of the support in an elevation view perpendicular to the front face thereof is wedge-shaped. A wedge-shaped construction provides for the least amount of plate support material to produce the required angle of taper.

Advantageously, the strap means includes a pair of straps affixed to the back of the support and each of sufficient length to pass around the rear seat back so that the ends of each of the straps can be fastened together snugly around the seat back.

The plate support may be made of a lightweight resilient material such as sponge covered by a flexible material such as, for example, a fabric. The mirror itself may be a sheet plastic material having a reflecting surface on one side.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings wherein:

DETAILED DESCRIPTION WITH REFERENCE TO THE DRAWINGS

Figure 1:
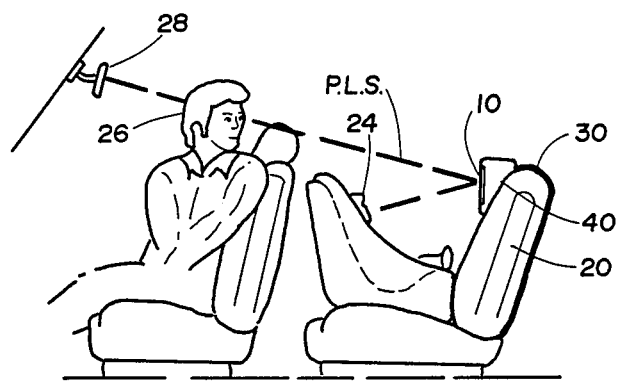
FIG. 1 is an elevation view of the mirror and seat relationship.
Figure 2:
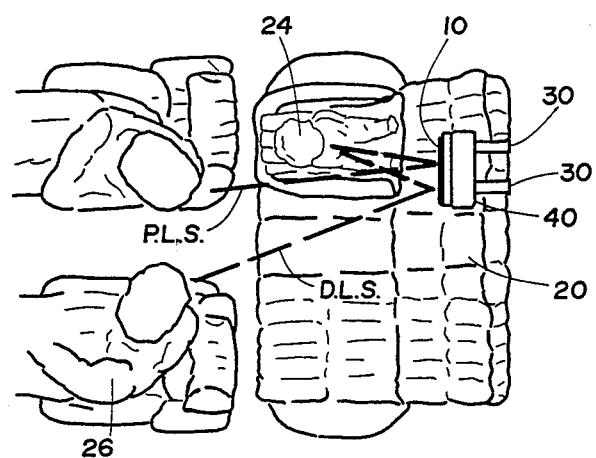
FIG. 2 is a plan or top view of the drawing of FIG. 1.

In FIGS. 1 and 2 of the drawings, the terms P.L.S and D.L.S refer to "passenger line of sight" and "driver line of sight," respectively.

Referring to FIGS. 1 and 2, a mirror assembly 40 is generally wedge-shaped and is normally positioned with its tapered surface against a rear seat back 20 of a vehicle proximate the top thereof. The angle of the taper 42 (see FIG. 3) is such that the front plate 10 is held at an angle so that a driver 26 or other occupant can simply turn his or her head and view the infant 24, seated in an infant seat and facing rearwardly of the vehicle, directly through the mirror plate 10 of the mirror assembly 40. Alternatively, the driver can view the infant through the rearview mirror without turning his or her head since the field of vision through the rearview mirror is normally adequate to include the mirror 10 so that the infant's face is visible to the driver when looking through the front rearview mirror 28. Thus, with the foregoing assembly there is no need for a front seat occupant to bodily turn and lean over the front of the seat in order to view the face of an infant.

Figure 3:
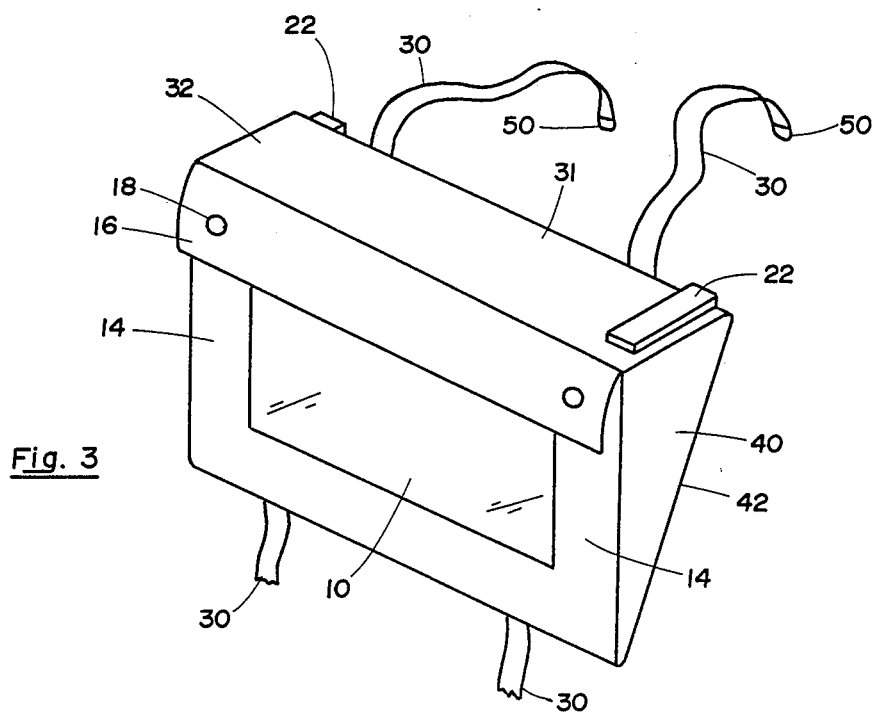
FIG. 3 is a perspective view of the mirror.
Figure 4:
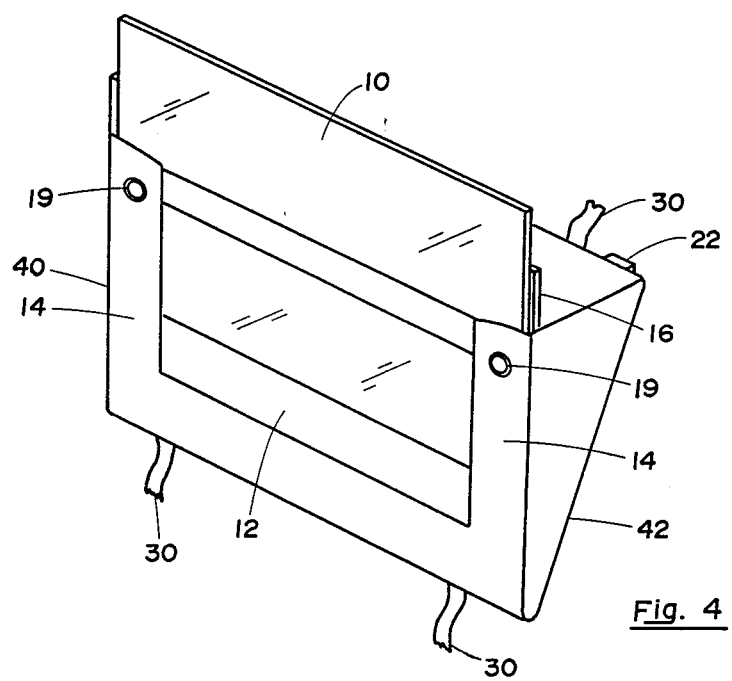
FIG. 4 is the mirror assembly of FIG. 3 with the mirror plate partially removed.

Referring to FIG. 3, there is shown in greater detail the mirror assembly 40 illustrated in FIGS. 1 and 2. The assembly consists of a foam wedge-shaped interior such as a sponge covered by a flexible fabric 32. The fabric has margins 14 on the front face thereof separated from the sponge so as to form a mirror receptacle or pocket. The top of the front surface is equipped with a flap 16 having snap fasteners 18 cooperating with corresponding snap fastener receptacles 19 on the margins 14. As shown in FIG. 4, the mirror plate 10, which consists of a plastic sheet silvered on one side, is simply slid into the receptacle and the flap 16 closed. Straps 30 are normally sewn onto the back surface of the assembly and have buckles 50 at one end of each strap 30 with the other straps being sufficiently long to encircle a rear seat back and engage the buckles 50.

A pair of shims 22 are sewn onto the top 31 of the assembly in such a way that they can be pivoted and slid between the seat back and the tapered surface 42 so as to move out the top of the assembly and tilt the front plate 10. Obviously, more than one such wedge can be provided for to achieve varying angles of adjustment. In addition, putting down only one of the shims 22 achieves both a vertical and a lateral adjustment.

Accordingly, while this invention has been described with reference to illustrative embodiments, this description is not intended to be construed in the limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A mirror assembly for use in observing an infant during travel in a vehicle in which the infant is located in a rear seat and faces toward a back of the vehicle, comprising:
   (a) a plate having a mirrored surface;
   (b) a plate support having a plate receptacle on one side for holding an image forming surface of said plate in an outwardly exposed position, said plate support having a tapered cross section in a plane substantially perpendicular to said plate with a thickness at a top of said support being larger than that at a bottom; and
   (c) strap means connected to said support and capable of being coupled to a rear seat back so as to hold said support in a selected lateral and vertical position on said seat back.

2. A mirror assembly according to claim 1 wherein the cross section of the support in a plane perpendicular to a front face thereof is wedge-shaped.

3. A mirror assembly according to claim 1 wherein said strap means includes a pair of straps affixed to a back of said support with each of sufficient length to pass around said rear seat back and to be fastened together with each strap snugly engaging the back seat.

4. A mirror assembly according to claim 1 wherein said plate support is made of a lightweight resilient material covered by a flexible material.

5. A mirror assembly according to claim 1 wherein said plate is a plastic sheet material having a mirrored surface.

6. A mirror assembly according to claim 1 wherein said plate support is sponge covered with a flexible fabric material.

* * * * *